United States Patent
Lyle et al.

(10) Patent No.: US 11,532,198 B1
(45) Date of Patent: Dec. 20, 2022

(54) MOVEABLE SAFETY DEPOSIT BOX SYSTEM

(71) Applicant: UIPCO, LLC, San Antonio, TX (US)

(72) Inventors: Ruthie D. Lyle, Durham, NC (US); Chi-Hsuan Lai, Helotes, TX (US); Ravi Durairaj, San Antonio, TX (US); Jo Anne Yau, San Antonio, TX (US); Sean Carl Mitchem, San Antonio, TX (US); Stacy Callaway Huggar, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 321 days.

(21) Appl. No.: 16/832,727

(22) Filed: Mar. 27, 2020

Related U.S. Application Data (60) Provisional application No. 62/825,872, filed on Mar. 29, 2019.

(51) Int. Cl.
| | |
|---|---|
| *H04L 29/06* | (2006.01) |
| *G07F 17/10* | (2006.01) |
| *G06F 21/32* | (2013.01) |
| *G06Q 10/10* | (2012.01) |
| *G06F 21/42* | (2013.01) |
| *H04W 4/80* | (2018.01) |
| *G06F 21/35* | (2013.01) |

(52) U.S. Cl.
CPC ............ *G07F 17/105* (2013.01); *G06F 21/32* (2013.01); *G06F 21/35* (2013.01); *G06F 21/42* (2013.01); *G06Q 10/109* (2013.01); *H04W 4/80* (2018.02)

(58) Field of Classification Search
CPC ........ G07F 17/105; G06F 21/32; G06F 21/35; G06F 21/42; G06Q 10/109; H04W 4/80
See application file for complete search history.

(56) References Cited

U.S. PATENT DOCUMENTS

| | | | | |
|---|---|---|---|---|
| 10,082,793 | B1 * | 9/2018 | Glaser | G06Q 10/06314 |
| 10,109,124 | B2 * | 10/2018 | Gilbertson | G07C 9/00912 |
| 10,565,809 | B2 * | 2/2020 | Gilbertson | G07C 9/00912 |
| 10,720,004 | B2 * | 7/2020 | Raquepaw | G06F 21/32 |
| 2005/0269404 | A1 * | 12/2005 | Landwirth | G07F 17/105 235/382 |
| 2017/0356232 | A1 * | 12/2017 | Green | E05G 1/04 |
| 2019/0172299 | A1 * | 6/2019 | Raquepaw | G07F 17/105 |

OTHER PUBLICATIONS

Advanced cargo security handheld network access device, Enriques et al, Apr. 2016 (Year: 2016).*

* cited by examiner

*Primary Examiner* — Jahangir Kabir
(74) *Attorney, Agent, or Firm* — Plumsea Law Group, LLC (57) ABSTRACT

A re-locatable safety deposit box facility that allows for 24/7 access by authorized personnel to their safety deposit boxes without the need for any attendants at the facility. The facility is self-contained and re-locatable, such that it can be moved from one location to another location. In some embodiments, the facility may be, for example, a standard size shipping container. It has interior dimensions that are sufficient to house an array of safety deposit boxes. The container may also be equipped with devices that may be used to lift the entire container up so that it may be moved to another location.

14 Claims, 8 Drawing Sheets

MOVEABLE SAFETY DEPOSIT BOX SYSTEM

CROSS-REFERENCE TO RELATED APPLICATIONS

This application claims the benefit of Provisional Application No. 62/825,872, filed Mar. 29, 2019, and titled "Moveable Safety Deposit Box System," which is incorporated by reference herein in its entirety.

TECHNICAL FIELD

This disclosure relates generally to systems for ensuring the security of safety deposit boxes in remote locations while providing access to the safety deposit boxes to persons authorized to have access to those boxes.

BACKGROUND

Personnel who are stationed, assigned or deployed to work in remote areas may need to nevertheless have ready access to important documents and/or valuables while stationed, assigned or deployed in those areas. Specifically, such personnel would need, on the one hand, to know that their important documents and/or valuables are securely stored while, on the other hand, would need to have ready access to those documents and/or valuables. In areas with a sufficient number of permanent concentrations of inhabitants who need to store their important documents and/or valuables, these needs may be met by institutions such as banks that make safety deposit boxes available to their customers in facilities under their control. However, in remote areas, such facilities may not exist, or may not be available to serve the needs of persons who are only temporarily in a particular remote location. Also, in some cases some areas may have facilities that may exist to serve the needs of the local population, but there may nevertheless still be a need for facilities affiliated with the deployed persons' home countries.

Also, in many cases, the facility containing the safety deposit boxes (referred to below as "the SDB facility") may need to be moved from one location to another location. For example, military personnel may be deployed to temporary posts in remote areas. When these posts are closed down, the SDB facilities may need to be moved from locations near the closed posts to other locations near newly opened posts, for example. Furthermore, because the SDB facility would be located in a remote area, the SDB facility may need to be unattended, yet accessible 24/7 by authorized personnel.

For these reasons, there is a need for systems for storing safety deposit boxes in unattended yet secure facilities that nevertheless allow ready access 24/7 to the safety deposit boxes by authorized persons.

SUMMARY

In one aspect, embodiments include a re-locatable self-contained safety deposit box facility with a container that has a floor, a roof, a front wall, a rear wall, a first side wall and a second side wall. The container includes an array of remotely-controlled safety deposit boxes in its interior space. It has a door in its front wall, and a secured access system mounted on the front wall. The secured access system has at least one of a biometric identification device, an interactive display and a keypad. The secured access system is designed to receive an appointment for a specific user from a remote server, and then to allow entry into the container by the specific user only after the secured access system has verified the specific user's identity. The secured access system must verify that only the specific user has entered the container through the door before opening the specific safety deposit box associated with the specific user.

In another aspect, embodiments include a safety deposit box facility with a structure that has an interior space defined by front wall, a rear wall, a first side wall, a second side wall, a floor and a roof. There is an array of safety-deposit boxes located on the floor of the interior space, and a door in the front wall of the structure providing access to the interior space. The container has a secured access system mounted on its front wall. The secured access system includes an interactive display and a device for communication with mobile devices in the vicinity of the door. The secured access system is designed to receive appointments reserving access to the interior space for a specific user at a specific date and time. The secured access system is also designed to verify an identity of the specific user intending to enter the interior space, based upon at least one of the following: a PIN entered by the user on the user's mobile device and communicated to the secured access system; a VIP passcode entered by the user on the user's mobile device and communicated to the secured access system; and a biometric identification. The secured access system is also designed to allow the user and no one else to enter the interior space and to open a safety deposit box associated with the specific user when the specific user has entered the interior space and closed the door.

In yet another aspect, embodiments include a system for allowing an authorized user to have access to safety deposit boxes housed in a container. The system has a server in communication with a secured access system associated with the container. The container has a front wall, a rear wall, two side walls, a floor and a ceiling (as seen from inside the container) or roof (as seen from outside the container). The front wall has an outer door permitting entry into the container. The container has an array of safety deposit boxes fixedly attached to its floor. The secured access system has at least one of the following mechanisms for verifying the identity of the authorized user as the authorized user attempts to enter the container: a keypad for allowing the user to enter a PIN, a pass code or a VIP code; a device for wirelessly receiving a PIN, a passcode or a VIP code transmitted by the authorized user's mobile device; and a biometric sensor for recognizing an authorized user's biometric indicia. The container has devices mounted on its roof such that cables may be attached to the attachment devices so that the container may be lifted up in its entirety.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

Figure 1:
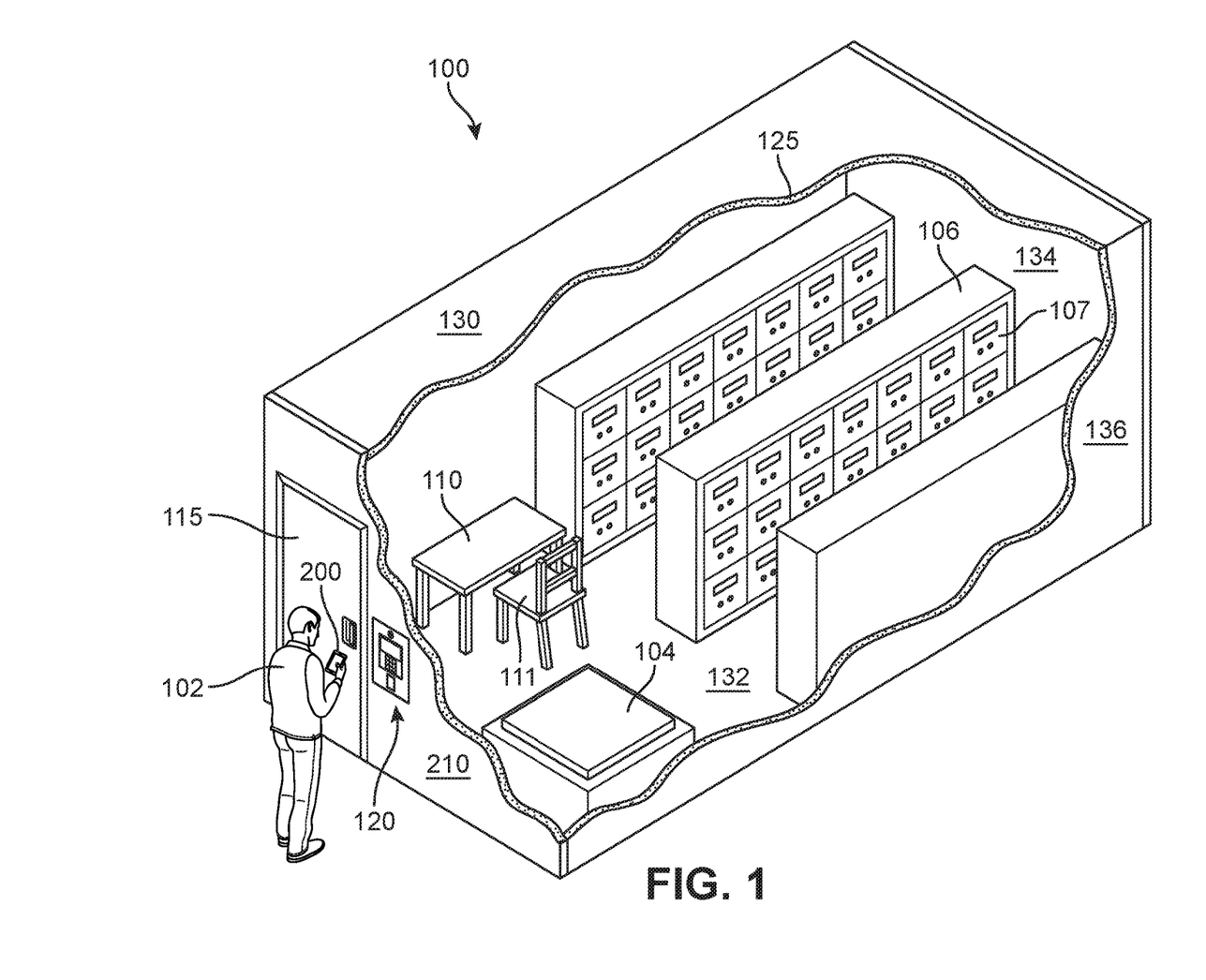
FIG. 1 is a schematic representation of a user getting ready to access his safety deposit box at an SDB facility in an exemplary embodiment.

The embodiments disclosed herein allow for 24/7 access by authorized personnel to their safety deposit boxes without the need for any attendants at the SDB facility. The SDB facility is self-contained and re-locatable, such that it can be moved from one location to another location. In some embodiments, the SDB facility may be, for example, a standard size shipping container. For example, the shipping container may be 8 feet wide, 8.5 feet high and 10 feet, 20 feet or 40 feet long. It may also have any other suitable dimensions that are standard for any given industry, region or country. It may be transportable on a flatbed truck, on a trailer, on a railroad freight car on any other suitable transportation equipment. It may have interior dimensions that are sufficient to house an array of safety deposit boxes as shown in FIG. 1, and allow a typical person to enter the container and have access to his or her safety deposit box. Generally, security may be enhanced by allowing only one specific authorized person at a time into the container. The container itself may be a self-contained structure with a steel floor, steel walls and a steel roof or ceiling. It may also have, at the corners of its roof or at other suitable locations, devices such as rings that may be used to lift the entire container up from its location so that it may be moved to another location.

Entry into the container may be controlled remotely via a server at the home bank or other institution. For example, a specific user may submit a request for access to his or her safety deposit box to the server using his or her laptop or mobile device. The server may then schedule an appointment for the specific user at a time that is convenient to the specific user and has not been allocated to another user.

At or around the scheduled time, the specific and authorized user may present himself or herself at the door to the SDB facility. For example, the SDB facility may be housed in a container 100, as shown in FIG. 1. The system may then confirm that the user is the person who has the appointment at that time, using any of the means described below. In some embodiments, the system may also check the surrounding area to make sure that the person with the appointment is the only one close to the door, so that only one person may enter the facility at a time. For example, the system may use a wide-angle video camera to survey the immediate environment of the door to the facility. Also, in some embodiments, the user may be using his or her mobile device (such as a smartphone or tablet) to communicate with the server to let the server know that he or she is present at the door to the SDB facility.

FIG. 1 shows an embodiment of an SDB facility with a container 100 that has arrays 106 of safety deposit boxes 107 firmly attached to the floor of the container and stored within container 100. In this example, the structure of the safety deposit box facility is container 100. Container 100 is a self-contained structure with a front wall 210, a roof or ceiling 130, a floor 132, a rear wall 134, and side walls 136. The walls and the roof/ceiling include insulation 125. Also, container 100 has an HVAC system 104 for controlling the temperature inside the container at a reasonably comfortable temperature. The container is also furnished with a desk 110 and a chair 111 for the user's convenience. A specific authorized user 102 outside the door 115 of container 100 is holding a mobile device such as a smartphone 200 in his or her hand, waiting to be granted access into container 100 via door 115. A server (shown in FIG. 6) may verify the user's identity based upon information obtained regarding user 102 by, for example, secured access system 120 (which is described below with reference to FIG. 2). Secured access system 120 may be mounted, for example, on the outside of front wall 210 adjacent to front door 115.

Figure 2:
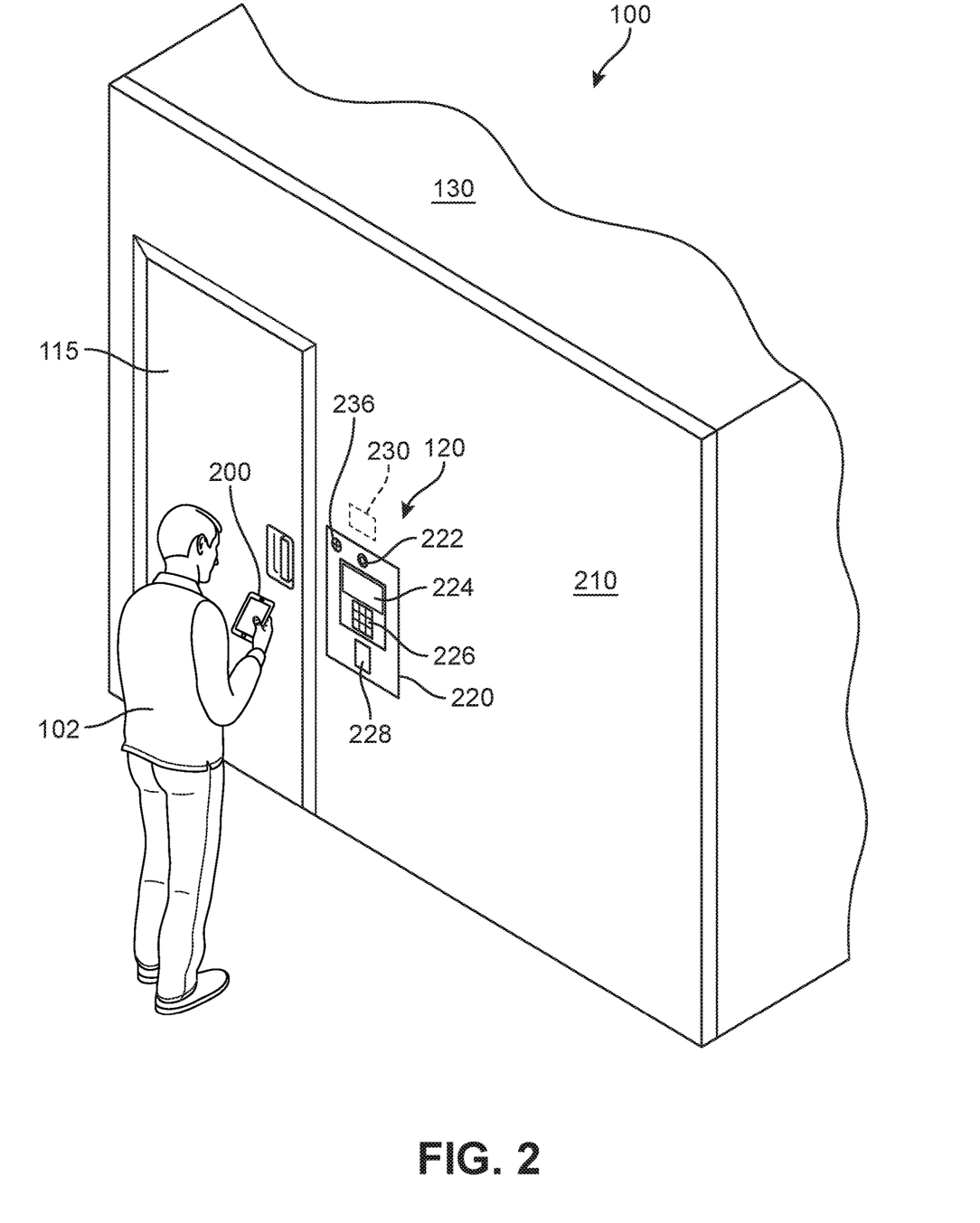
FIG. 2 is a close-up view of the front of the facility illustrated schematically in FIG. 1.

FIG. 2 is a close-up view of an embodiment of the front door interface that provides access to the interior of container 100 only to persons authorized to have access to the safety deposit boxes 107. As shown in FIG. 2, user 102 has presented himself (or herself) at the door 115 of container 100 in front wall 210 according to a scheduled appointment time (as discussed below with reference to FIG. 6). User 102 then requests that he or she be allowed to enter into container 100. For example, user 102 may submit this request to a remote server (server 602 shown in FIG. 6, for example) over a communications medium such as the Internet using a mobile device 200 such as a smartphone. Mobile device 200 may communicate with secured access system 120 using near field communication (NFC) technology via proximity sensor 230, for example. Interactive display 224 in secure access system 120 instructs user 102 to verify his or her identity, by, for example, entering a PIN or a VIP code into keypad 226. Interactive display 224 may issue these instructions visibly on display 224. A VIP code is a code—often a numeric code—that is transmitted to a device held or viewed by the user and that is only valid for a short period, such as 30 seconds or a few minutes. It may alternatively issue these instructions audibly via a speaker 236. The user's identity may also or alternatively be verified by biometric scanner 228, which could include, for example, using facial recognition based upon the user's facial features, voice recognition based upon a voiceprint of the user, a retinal scan and/or fingerprint identification.

Figure 3:
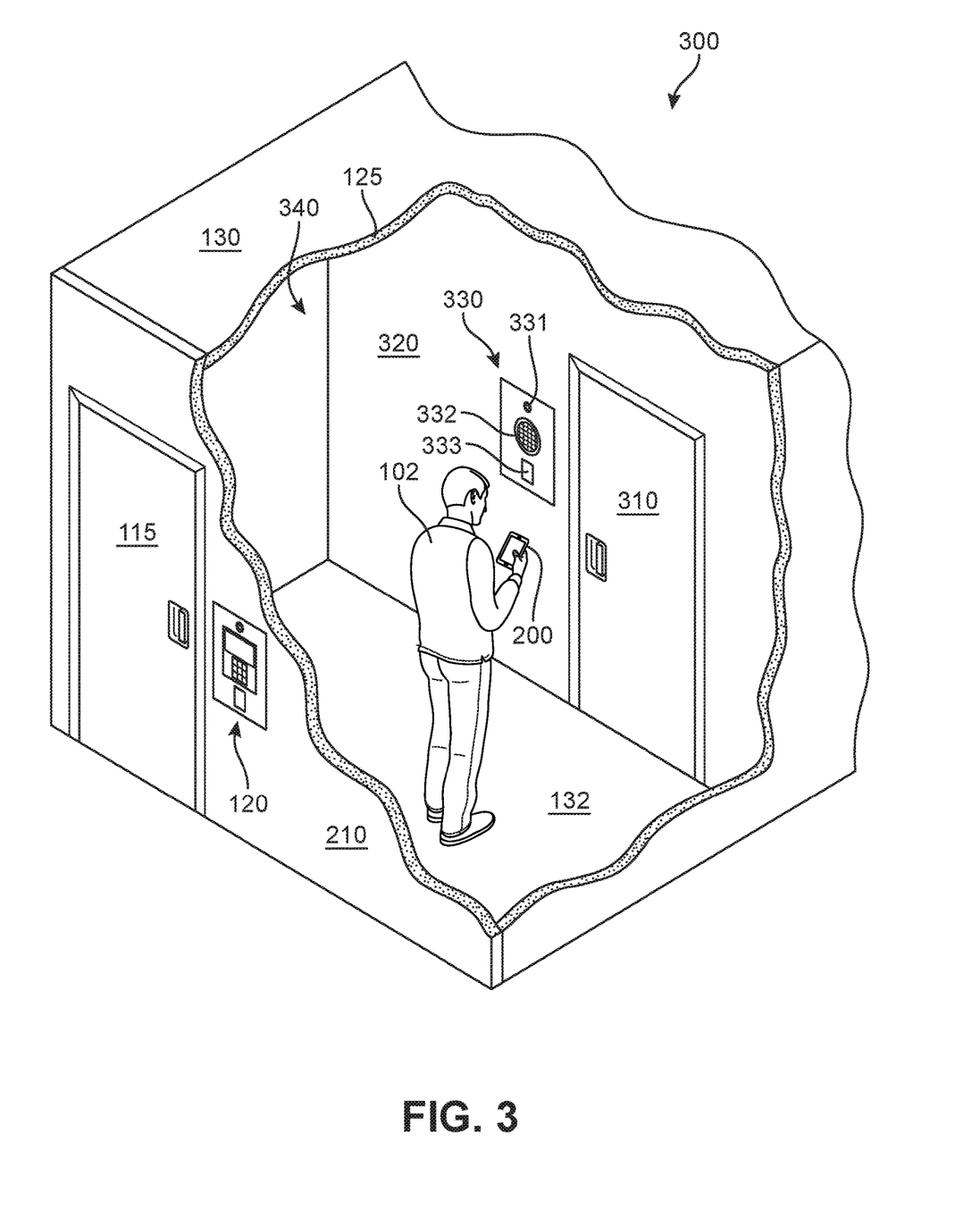
FIG. 3 is a close-up view of a front portion of an alternative embodiment of an SDB facility.

FIG. 3 is a close-up view of an alternative embodiment of an SDB facility. In this embodiment, container 300 has a small lobby 340 that the user enters through door 115 to stand on floor 132 of container 300. Small lobby 340 has an inner door 310 that must be opened to allow access to the safety deposit boxes. Thus, after user 102 has passed through door 115, he or she is standing in a small lobby 340 at the front of container 300, before inner door 310 in inner wall 320. Wide-angle video camera 331 captures images of the interior of small lobby 340. Inner secured access system 330 may use the captured images to ensure that user 102 is the only person in small lobby 340.

Inner secured access system 330 may also require the user to submit further identification before allowing the user to pass through inner door 310. For example, if user 102 had verified his or her identity to pass through door 115 using a PIN or a VIP access code, inner secured access system 330 may require user 102 to submit to biometric identification. In that case, biometric sensor 333 may be, for example, a fingerprint sensor. In this example, speaker 332 in inner secured access system may instruct user 102 to place his or her thumb (or other digit) against biometric sensor 333. In another embodiment, biometric sensor 333 could be, for example, a retinal scanner, in which case speaker 333 would instruct user 102 to peer into biometric sensor 333 so that his or her identity may be confirmed biometrically. Other types of biometric verification include, for example, voice recognition and facial recognition.

Figure 4:
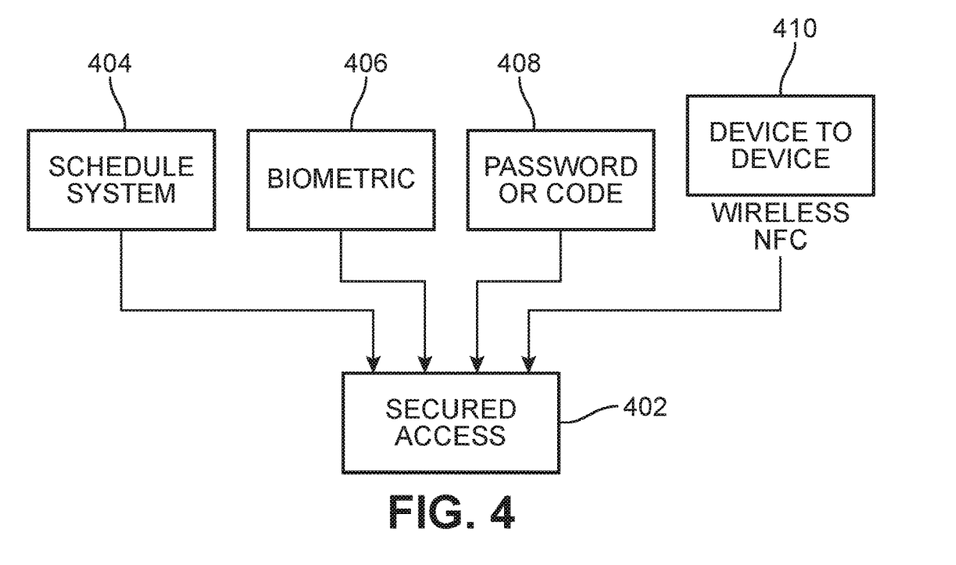
FIG. 4 is a block diagram showing certain of the possible modules that may be used to guarantee secure access to the SDB facility, in an exemplary embodiment.

FIG. 4 is a schematic block diagram showing certain of the possible modules that may be used to guarantee secure access to the safety deposit boxes 107 in container 100. As explained below with reference to FIG. 6, module 404 has scheduled access specifically for user 102 at a specific date and time. No other users may enter through door 115 at that specific date and time.

In the embodiment shown in FIG. 2, device to device module 410 communicates with user 102's handheld mobile device 200 over, for example, a wireless near field communication system or NFC system. The identity of user 102 may be verified by secured access system 402, based upon a password or code 408, or a PIN or a VIP code, for example. It may also be based upon biometric identification such as a fingerprint, a retinal scan, voice recognition or facial recognition. In the embodiment of FIG. 2, secured access system 402 may refer to secured access system 120. In the embodiment of FIG. 3, secured access system 402 may refer to both secured access system 120 at the outer door and inner secured access system 330 at the inner door.

Figure 5:
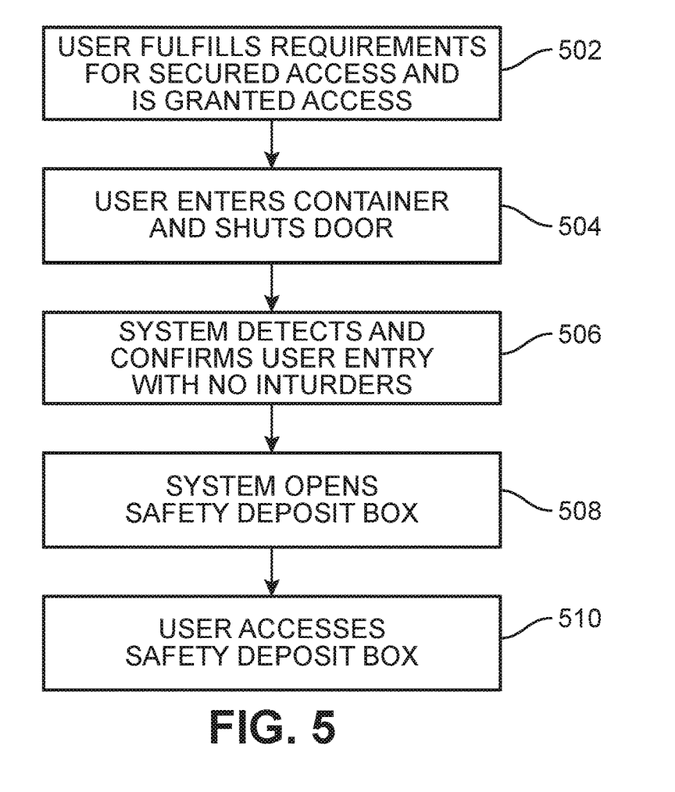
FIG. 5 is a flow chart outlining steps required to provide secure access to the SDB facility for an authorized user, in an exemplary embodiment.

FIG. 5 is a flowchart that details the processes used to allow a user entry into container 100 and to open his or her safety deposit box. In step 502, user 102 has fulfilled the requirements for access to the safety deposit boxes. In the embodiment of FIG. 2, in step 504 user 102 then enters container 100 and shuts door 115 behind him or her. The system then confirms that only user 102 has entered container 100, and that there are no intruders in step 506. Once this is confirmed, at the user's request the system opens user 102's own specific safety deposit box in step 508 (as described below with reference to FIG. 8). Finally, in step 510 user 102 can access his or her safety deposit box.

The process shown in FIG. 5 is basically the same for the embodiment of FIG. 3, except that steps 504 and 506 now entail submitting identification first at door 115 to enter small lobby 340, then submitting further identification to pass through door 310. In particular, in the embodiment of FIG. 3, inner secured access system 330 uses wide-angle video camera 331 to ensure that user 102 is the only person in small lobby 340 before allowing access to the safety deposit boxes 107.

Figure 6:
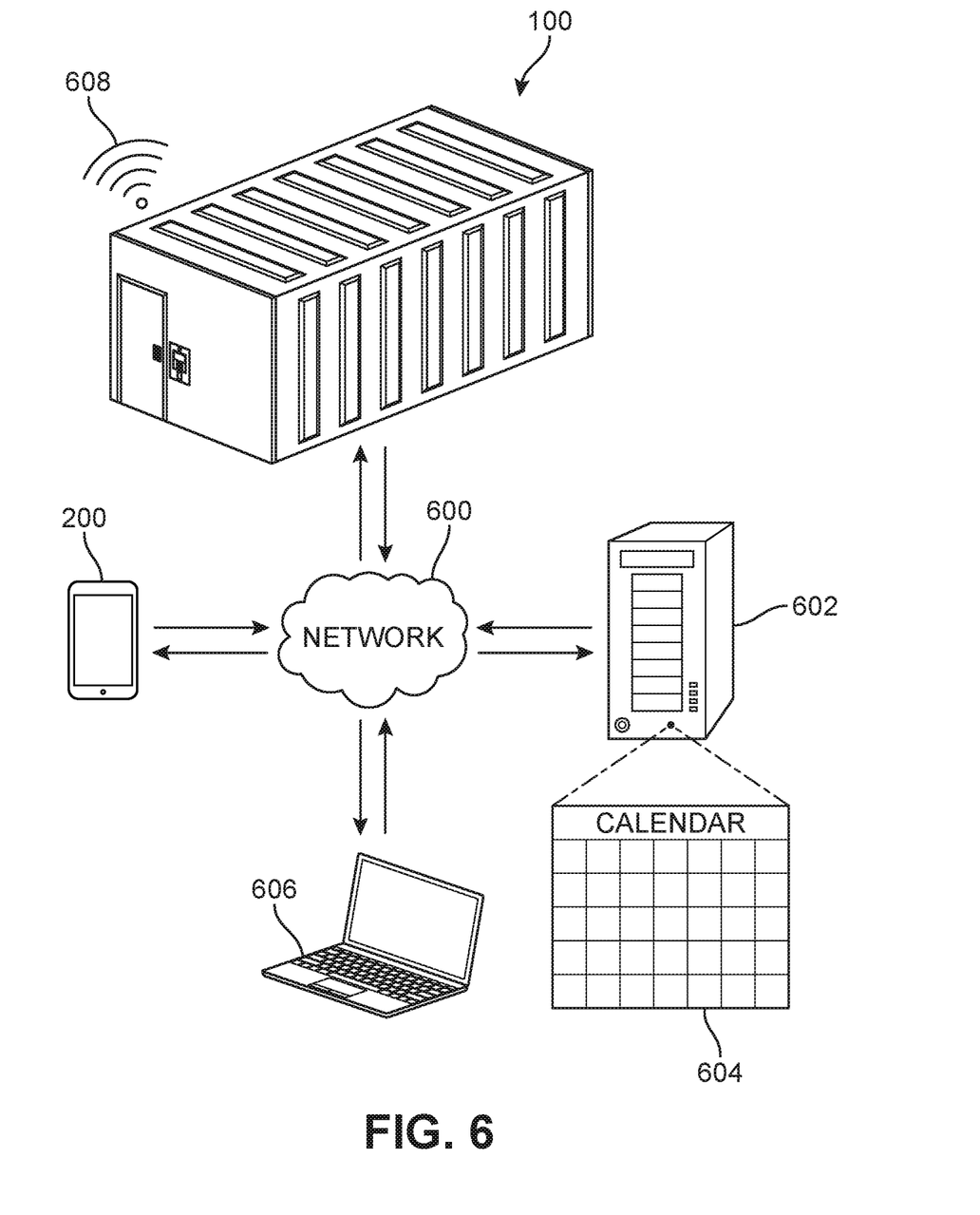
FIG. 6 is a schematic diagram showing communications between various components of an exemplary system for providing secure access to safety deposit boxes.

FIG. 6 is a schematic diagram showing communications over a network 600 such as the Internet between users and various components of the system. Server 602 may be located in a bank (or other institution) in the United States or Europe or elsewhere, for example. User 102 may request an appointment over network 600 using a laptop 606 or a mobile device 200. Network 600 may be the Internet, or it may be a telephone network, an RF network, or another type of communication system. Server 602 consults its appointment calendar 604 for container 100 and schedules the appointment with container 100 over container 100's communication system 608. Communication system 608 may be a wired or wireless communication system that allows the secured access system 120 and/or inner secured access system 330 in container 100 to communicate with server 100. For example, server 100 may have stored one or all of the possible identification indicia for user 102 such as passwords, VIP codes, voice recognition, facial recognition, fingerprints and/or retinal images. When requested by one or both of the secured access system 120 or inner secured access system 330, server 602 may provide one or more of these identification indicia to one or both of secured access system 120 or secured access system 330. Alternatively, any or all of these identification indicia may be stored locally at either or both of secured access system 120 or inner secured access system 330. However, storing all these indicia in server 602 may be advantageous, since the indicia would be available for use in other facilities that may require verification of a person's identity.

Figure 7:
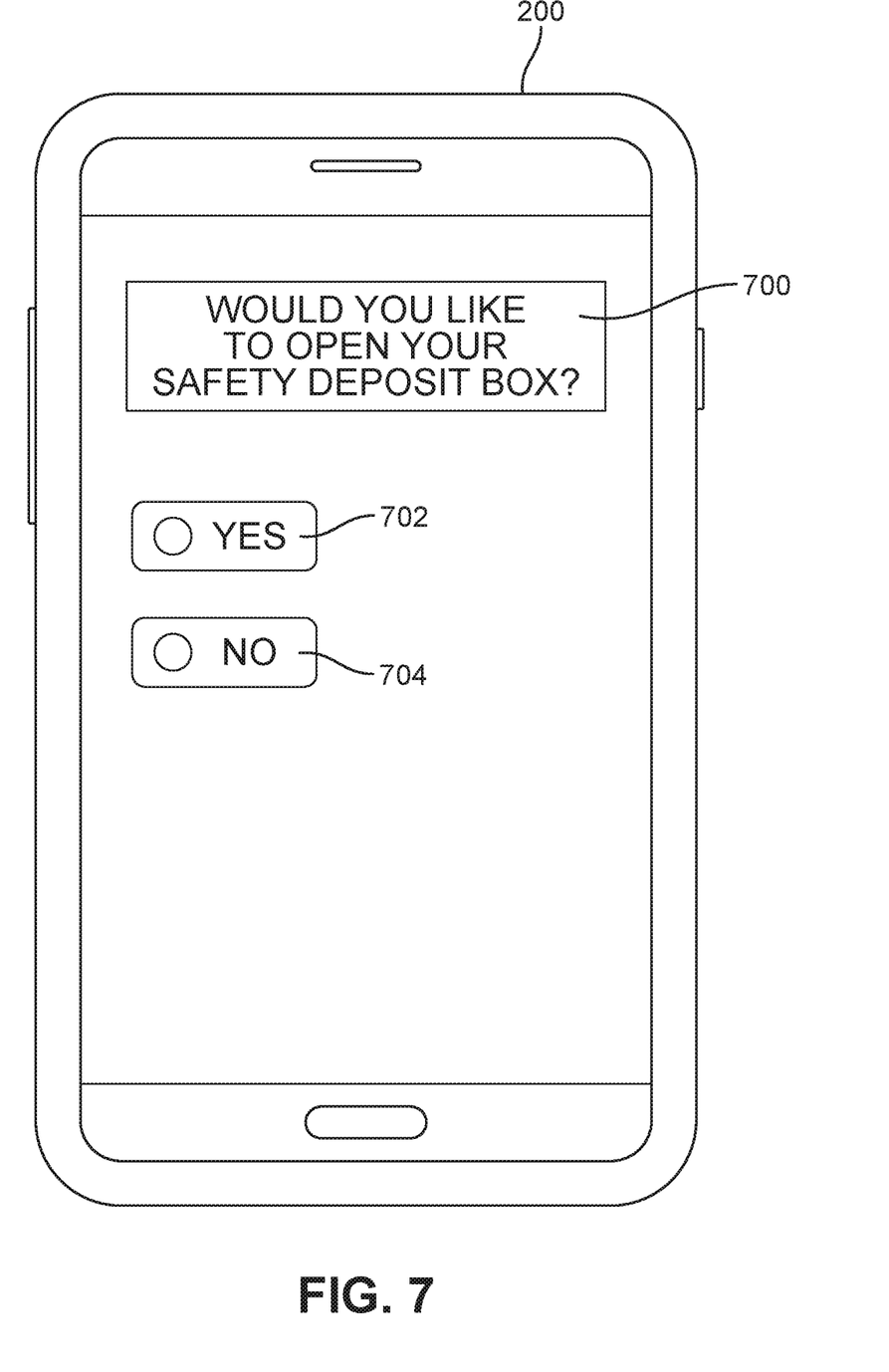
FIG. 7 is a close-up view of a user's smartphone, in an exemplary embodiment.
Figure 8:
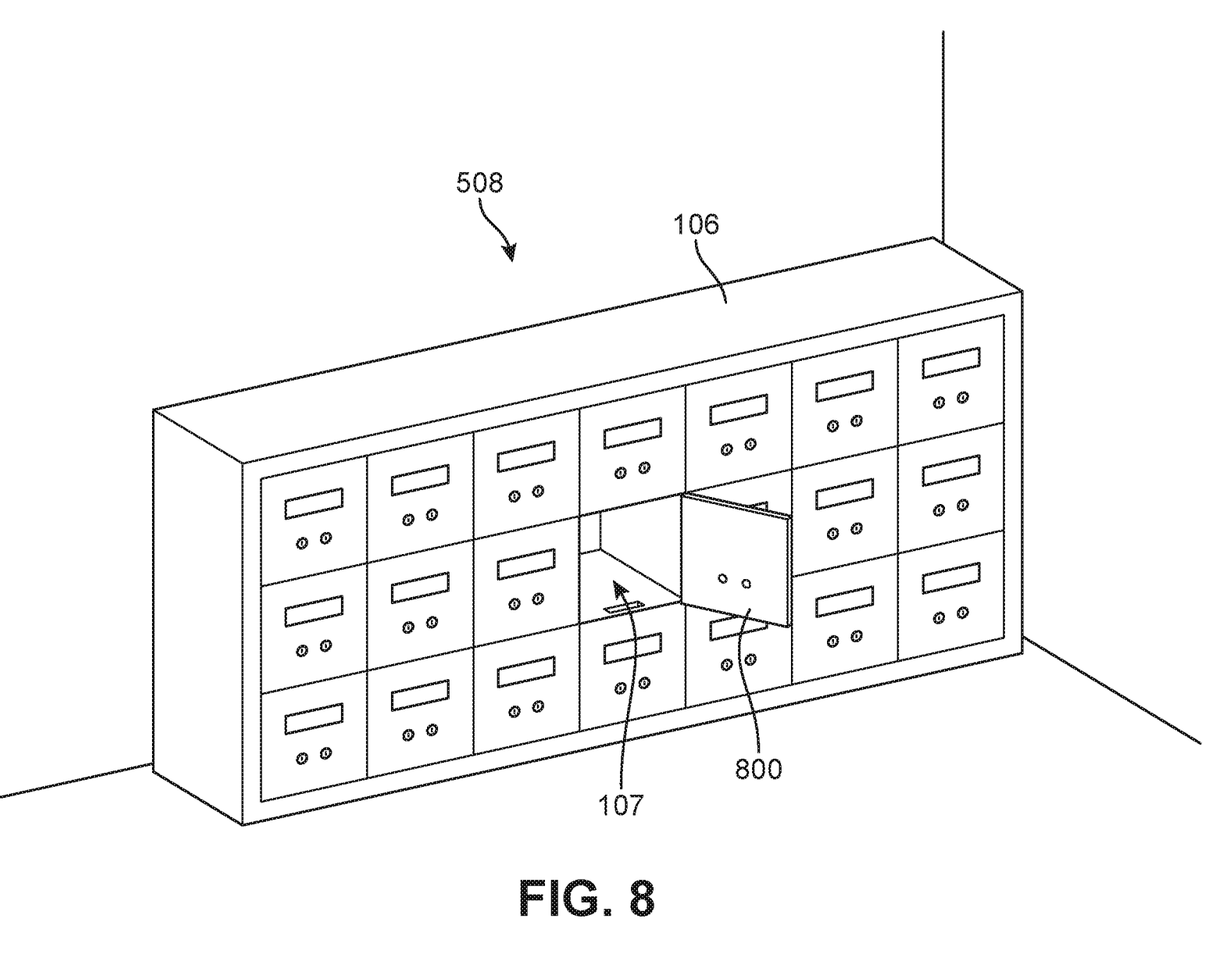
FIG. 8 is a schematic diagram of an array of safety deposit boxes showing one open box, in an exemplary embodiment.

FIG. 7 is an illustration of the display on user 102's mobile device when user 102 has entered container 100. The system asks user 102 if he or she would like to open his or her safety deposit boxes using NFC technology, for example, or some other technology. User 102 may respond by touching the "YES" box 702 if he or she would like to open his or her safety deposit box 107 in safety deposit box array 106. As shown in FIG. 8, if user 102 answers "YES," safety deposit box door 800 opens to allow access to safety deposit box 107.

Figure 9:
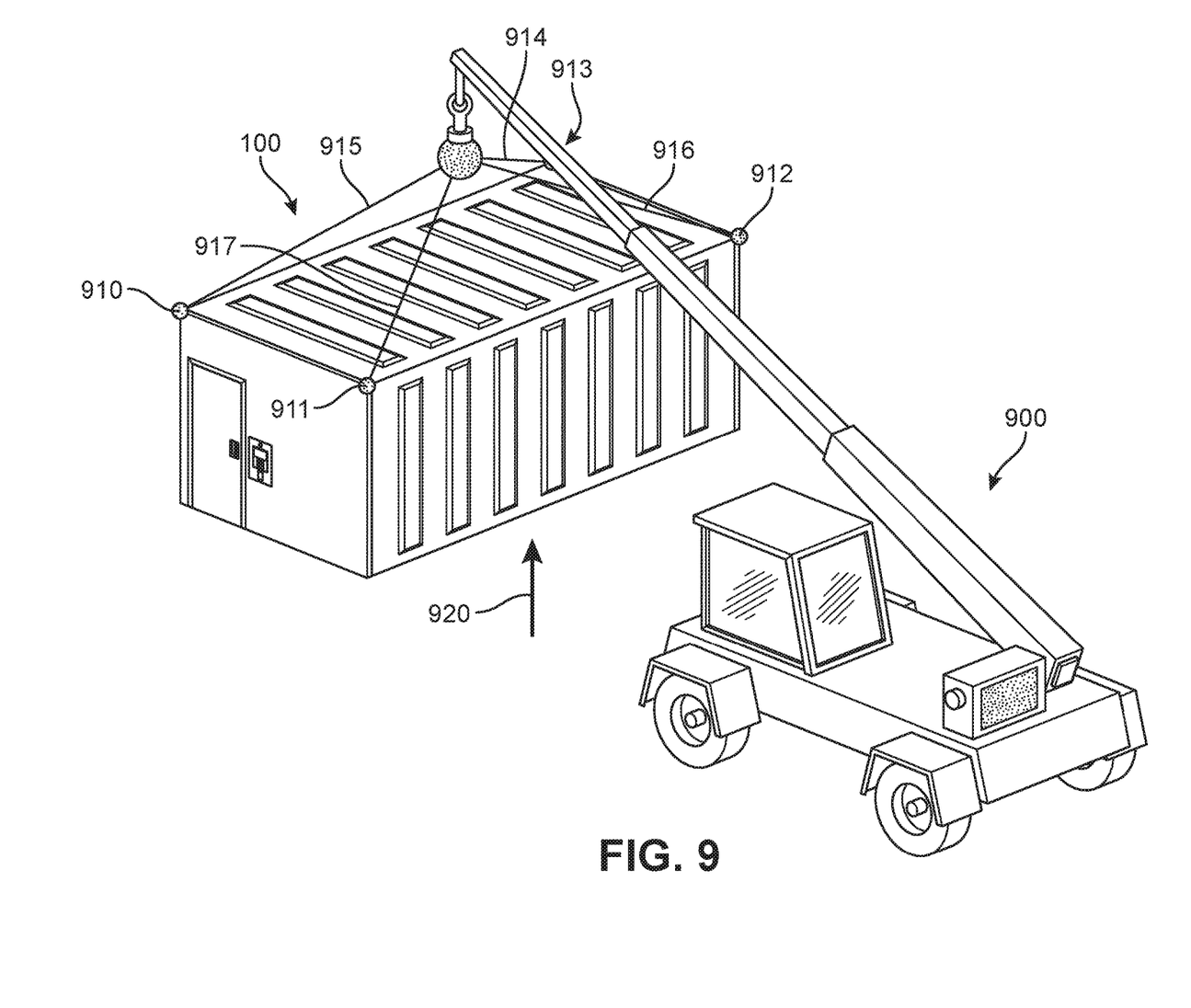
FIG. 9 is a schematic representation of a system for moving an SDB facility from a location, in one embodiment.

Container 100 may be integrally moved in its entirety from one location to another without disturbing the integrity of the safety deposit boxes stored in container 100. As shown in FIG. 9, a mobile crane 900 (or other lifting apparatus) may be used to lift container 100 from one location to move it to another location. This may be necessary, for example, because a military post or other facility has changed locations. In that case, mobile crane 900 lifts container 100 upwards as indicated by arrow 920 in FIG. 9. Mobile crane 900 does so using its boom 913 and cables 914, 915, 916 and 917 that are attached to secure attachment devices (such as rings, for example) 910, 911, 912 and 914 at the corners of container 100. Mobile crane 900 may, for example, lift container 100 and place it on a flatbed truck or other transportation means for transportation to its new location.

This system allows the users of the safety deposit boxes to have their safety deposit boxes moved to a new location as their post is moved to a new location. The users thus have continued access to their safety deposit boxes even when their posts are moved to a new location. For example, the users may be military personnel whose posts are often moved to different locations. The users may also be other types of personnel who work in one location for a limited period and then are moved to another location. For example, the users may be construction engineers who may work at a given location to build a facility for several weeks, months or years, and then move to another location to build another facility.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A re-locatable self-contained safety deposit box facility for use by one or more personnel deployed by employers at a remote location, where the safety deposit box facility is affiliated with the employer and personnel, the safety deposit box facility comprising:
   a container that has a floor, a roof, a front wall, a rear wall, a first side wall and a second side wall;
   wherein the container comprises:
      an array of remotely-controlled safety deposit boxes in its interior space;
   attachment devices along the roof of the container for attaching the container to a set of cables so that the container may be lifted up in its entirety and moved regularly without disturbing the integrity of the array of safety deposit boxes stored in the container, thereby allowing the array of safety boxes to be moved collectively and in their entirety from one location to another location;
   a door in its front wall;
   a secured access system mounted on the front wall, wherein the secured access system comprises at least one of a biometric identification device, an interactive display and a keypad;
   wherein upon a specific user submitting an appointment request over a network to a remote server, the remote server schedules an appointment with the secured access system for a specific appointment time that has not been allocated to another user;
   wherein the secured access system is configured to allow the specific user entry only during the scheduled appointment time through the door into the container only after the secured access system has verified the specific user's identity; and
   wherein the secured access system verifies that only the specific user has entered the container through the door and ensures that only one person is in the container at a time before opening a specific safety deposit box associated with the specific user.

2. The re-locatable self-contained safety deposit box facility of claim 1, wherein the container further includes insulation in its roof and walls, and an HVAC system for controlling a temperature inside the container.

3. The re-locatable self-contained safety deposit box facility of claim 1, wherein the secured access system is configured to communicate with a mobile device associated with the specific user using near field communications technology.

4. The re-locatable self-contained safety deposit box facility of claim 1, wherein the biometric device is one of a fingerprint sensor, a retinal scanner a facial recognition device and a voice recognition device.

5. The re-locatable self-contained safety deposit box facility of claim 1, wherein the specific user communicates, via a mobile device, to the remote server, to let the remote server know that they are present at the door before the secured access system verifies their identity.

6. The re-locatable self-contained safety deposit box facility of claim 1, wherein the remote server is configured to receive requests from multiple users for appointments to enter the container and maintains a calendar of such appointments.

7. The re-locatable self-contained safety deposit box facility of claim 1, wherein the secured access system comprises a proximity sensor that detects the presence of mobile devices in its vicinity and ensure that only one person is in the container at a time.

8. A system for allowing an authorized user to have access to safety deposit boxes housed in a container comprising:
   a server for a banking institution in communication with a secured access system associated with the container, said container having a front wall, a rear wall, two side walls, a floor and a roof, and said front wall having an outer door permitting entry into the container;
   an array of safety deposit boxes fixedly attached to the floor of the container;
   the secured access system comprising at least one of the following mechanisms for verifying the identity of the authorized user as the authorized user attempts to enter the container via the outer door:
      a keypad for allowing the authorized user to enter a password or a passcode;
      a device for wirelessly receiving a password or a passcode transmitted by the authorized user's mobile device;
      a biometric sensor for recognizing an authorized user's biometric indicia; and
   wherein the container comprises attachment devices such that cables may be attached to the attachment devices so that the container may be lifted up in its entirety and moved regularly without disturbing the integrity of the array of safety deposit boxes stored in the container, thereby allowing the array of safety boxes to be moved collectively and in their entirety from one location to another location for use by personnel who work in one location for a limited period and then are moved to another location.

9. The system of claim 8, wherein the secured access system is configured to communicate wirelessly with the authorized user's mobile device.

10. The system of claim 8, wherein the biometric indicia include at least one of a fingerprint, facial features, voiceprints and a retinal scan.

11. The system of claim 8, wherein the secured access system uses near field communication to wirelessly communicate with the authorized user's mobile device.

12. The system of claim 8, wherein the secured access system comprises a wide-angle video camera that is configured to survey an immediate environment of the outer door to make sure that the authorized user is the only one close to the door, and only one person enters the facility at a time.

13. The system of claim 8, further comprising a small lobby formed by an inner wall, wherein the small lobby is accessible through the outer door, and wherein the small lobby comprises an inner door in the inner wall that provides access to the array of safety deposit boxes in the container.

14. The system of claim 13, wherein the small lobby comprises a second secured access system configured to require further verification of the authorized user's identity before allowing the user to enter further into the container through the inner door.

* * * * *